Patented Oct. 3, 1933

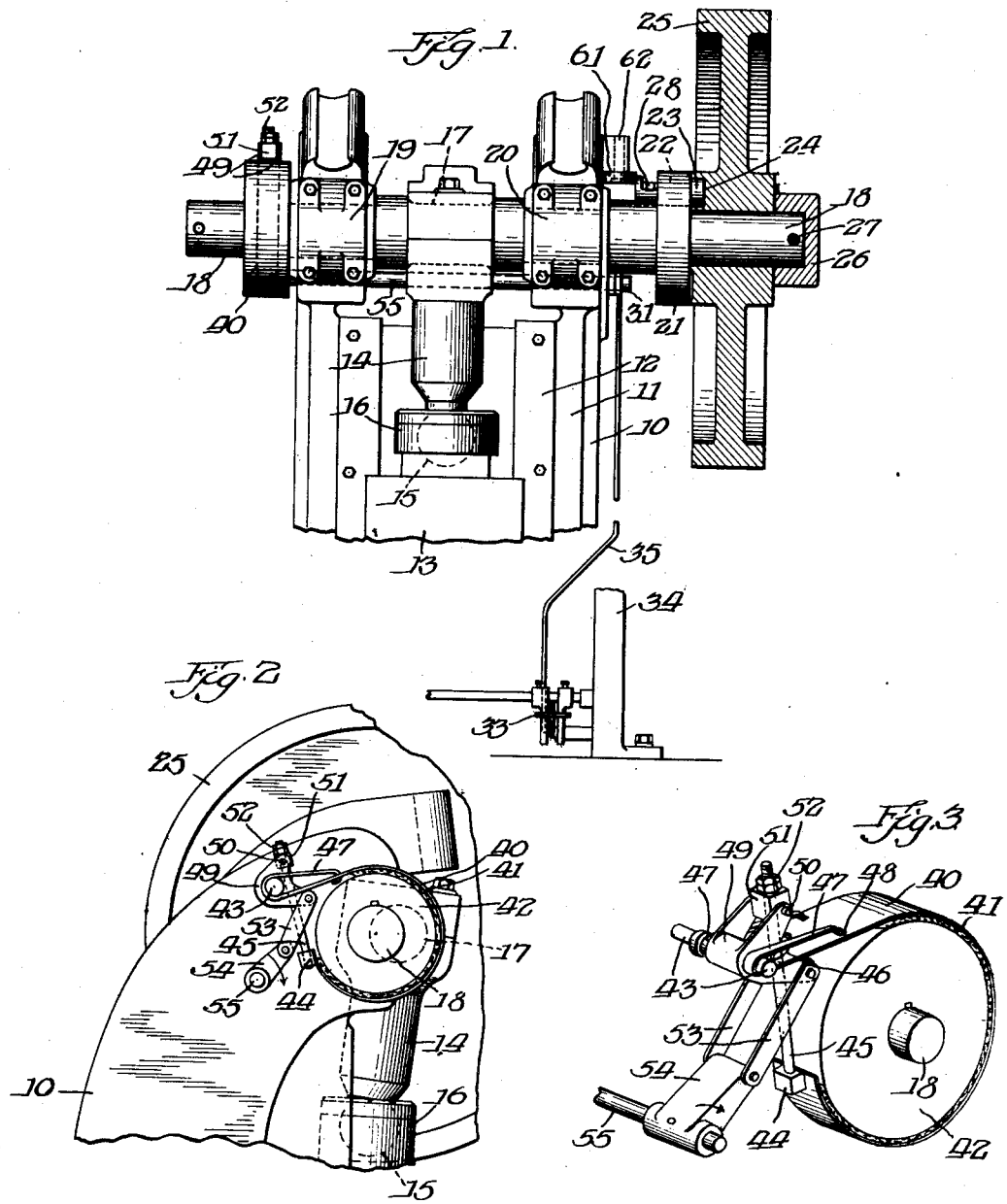
Oct. 3, 1933.  H. C. H. WALSH  1,928,711
POWER PRESS
Filed March 2, 1931  2 Sheets-Sheet 1
Inventor:
Harry C. H. Walsh

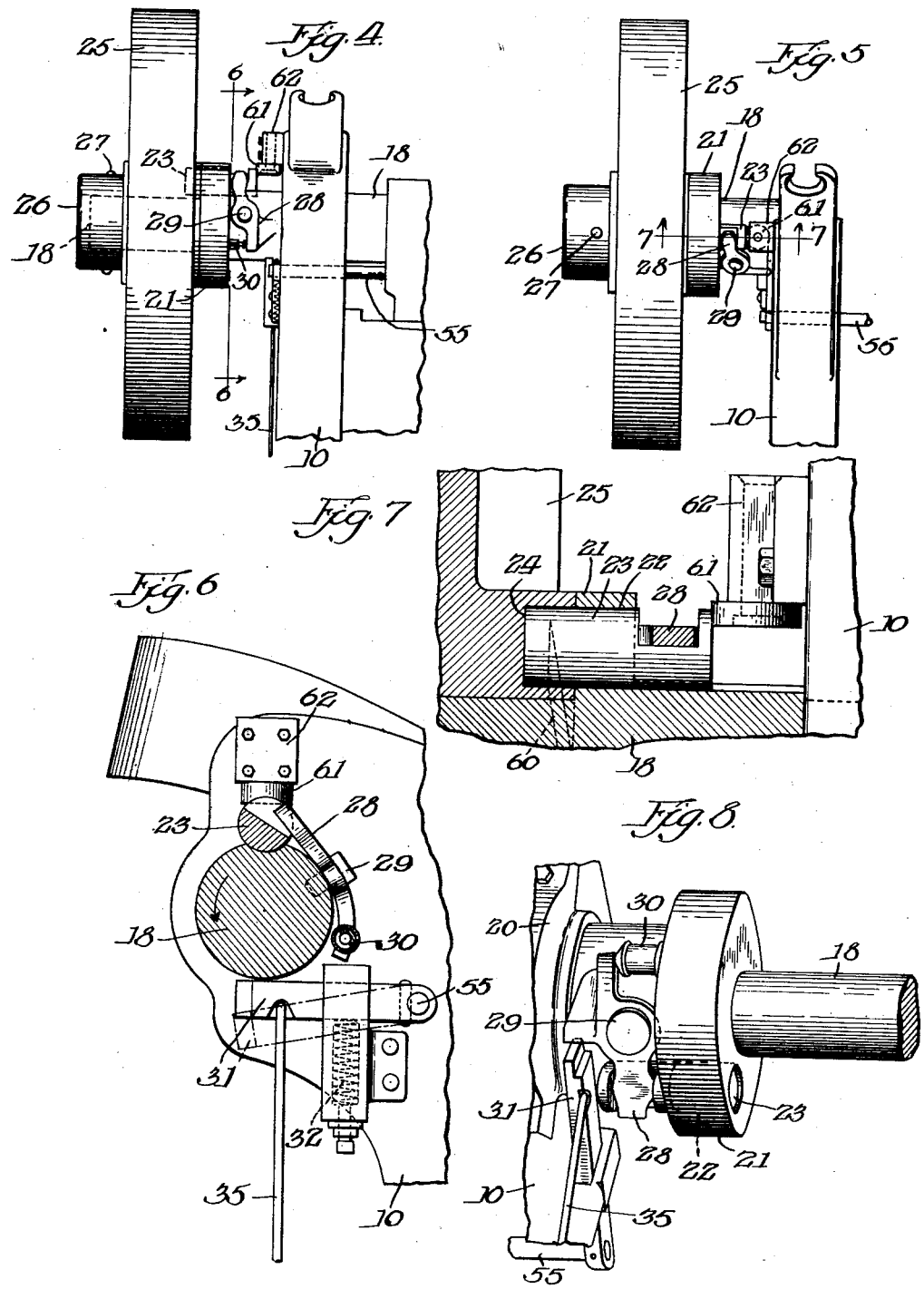

1,928,711

UNITED STATES PATENT OFFICE 1,928,711

POWER PRESS

Harry C. H. Walsh, Chicago, Ill.

Application March 2, 1931. Serial No. 519,642

5 Claims. (Cl. 192—17)

This invention relates generally to power presses of the kind which utilize a hand or foot control for actuating certain clutch and braking mechanisms by which to govern the operating movements of the press; and more particularly the present improvements are directed to the construction of the clutch and braking mechanisms, and the coordinated operation thereof as controlled by the operator in charge.

Further objects and details will appear from a description of the invention in conjunction with the drawings wherein—

Figure 1 is a fragmentary view showing in front elevation the upper portion of a press, with the fly wheel shown in section;

Fig. 2 is a side elevation showing the brake mechanism;

Fig. 3 is an enlarged perspective view of the brake mechanism;

Fig. 4 is a rear elevation of the clutch mechanism;

Fig. 5 is a bottom view of the parts shown in Fig. 4;

Fig. 6 is a sectional view taken on line 6—6 of Fig. 4;

Fig. 7 is an enlarged sectional view taken on line 7—7 of Fig. 5; and

Fig. 8 is an enlarged perspective view of the clutch mechanism showing the clutch bolt withdrawn from contact with the fly wheel (not shown).

The press may be of usual construction, in that it comprises a base (not shown) from which upstand standards 10 furnishing overhanging guide members 11 carrying guide plates 12 for the reciprocation of a sliding head 13 which carries the die or other tool employed by the press. The sliding head, as shown, is actuated by a pitman 14 terminating at its lower end in a ball mounted in a socket 16 at the upper end of the sliding head 13. The pitman at its upper end engages the cranked portion 17 of a crank shaft 18 which is carried within journal mountings 19—20 formed at the upper side ends of the standards 10. At a point outside of the standard 10, and formed on the crank shaft 18, is a clutch head 21 having an opening 22 in axial alignment therewith in which is slidably mounted a clutch bolt 23. A driving element, such as a fly wheel 25 having recesses 24 in the face of its hub is mounted on the shaft adjacent the clutch head 21, and held thereon by a cap 26 secured to the shaft by a pin 27.

Referring to Figs. 6 and 8, the clutch belt 23 is moved into and out of engagement with the fly wheel by a bell crank 28 pivotally secured to the crank shaft as by a pin 29. By means of a spring 30, the bell crank normally urges the clutch into engagement with the fly wheel. A swinging latch 31, which is normally held in the path of the bell crank by a spring 32, trips the bell crank to disengage the clutch bolt at a predetermined point in the rotation of the crank shaft, as shown in Fig. 8. The latch may be moved from its normal position by a treadle 33 mounted on a leg 34 which supports the press, the treadle and latch being interconnected by a rod 35. The details of these features form no part of the present invention and need not be further described.

Figs. 1, 2 and 3 illustrate an improved form of brake mechanism which releases the crank shaft upon actuation of the treadle. This mechanism, by preference, includes a band 40, optionally lined as at 41, surrounding a brake drum 42 which is made fast with the shaft 18. One end of the band may be secured to a stationary lug 43 projecting from the standard 10, and the free end of the band may be connected by a block 44 to an adjusting bolt 45. As shown in Fig. 3, the band is bifurcated at 46 on its fixed end to provide a pair of straps 47 that may be bent around the lug 43 and anchored in openings 48 in the band. Rockably mounted on the lug 43 between the band straps 47 is a bifurcated bell crank 49 furnishing at one end a mounting for trunnions 50 which extend oppositely from a block 51 through which extends the bolt 45 secured thereto by lock nuts 52. The other end of the bell crank 49 is connected by links 53 to an arm 54 which is keyed to a rock shaft 55 mounted in the standards 10 and extending therethrough to the opposite side of the press (see Fig. 1) where it is secured to the latch 31.

The latch 31 which is connected fast at one end to the shaft 55, upon swinging down, will rotate the shaft to move the arm 54 in the direction indicated by the arrow in Fig. 2; this in turn rocks the bell crank 49 by the links 53 to release the free end of the brake band, thus leaving the crank shaft free to be rotated.

The brake mechanism is so constructed that it is released simultaneously with each normal operation that occurs. The operator depresses the treadle which pulls down the rod 35 to swing down the latch 31, as shown in Fig. 6, thereupon releasing the brake as above described. At the same time the bell crank 28 is released from engagement with the latch to advance the clutch bolt into one of the recesses 24 in the fly wheel, thus rotating the crank shaft to make the desired punching; upon completing its cycle of movement the clutch bolt is withdrawn by the latch 31. The brake band is normally urged to act upon the brake drum 42 by the spring 32 which presses against the latch 31.

It is found that frequently the clutch bolt 23 is not always completely seated in the recess 24, with the result that on the rebound, after the punch, the crank shaft is thrust forward on the upstroke and the clutch bolt rides on the bevel 60 which tapers outwardly from the recess 24, or the bolt may only be advanced far enough to permit the edge to be sheared off or rounded. This is prevented by providing a roller or cam secured to the standard 10 or to block 62—the roller or cam being in such a position that when the clutch bolt is not completely seated, it will contact with same which positively drives it to the bottom of the recess (see Fig. 7).

The punch press, as above described, is operated in the following manner: With the clutch parts in normal position, as viewed in Fig. 8, the treadle is depressed to withdraw the latch from contact with the bell crank. When the bell crank is released, the cushion spring bearing against one arm thereof advances the clutch bolt into a recess in the hub of the fly wheel, thus connecting the fly wheel to the crank shaft. At the same time that the latch is withdrawn, it slightly rotates the rock shaft 55 and arm 54 which releases the brake band from contact with the brake drum, thus permitting the crank shaft to be freely turned when the clutch bolt engages the fly wheel. This is important because, if the brake is not released, the friction exerted thereby causes an added load to be thrust upon the clutch bolt and particularly at that point where the clutch bolt is being moved into engagement with the fly wheel.

As the crank shaft rotates, the clutch bolt is brought in alignment with the roller 61 where, if it is not already seated in the recess 24, it will be forced therein by contacting with the roller. Upon releasing the treadle, the spring 32 returns the latch to its normal position to engage the bell crank upon completion of one revolution of the crank shaft, and at the same time the brake band is brought into engagement with the brake drum, so that the crank shaft will be stopped immediately when the clutch bolt is withdrawn.

The brake mechanism herein described is particularly advantageous, in that it may be readily attached to a standard punch press and be operated simultaneously with the latch for releasing the clutch bolt.

Although the machine has been described with particularity, it is not the intention to limit the invention to the precise details of construction hereinbefore set forth, since it is obvious that a proper co-ordination between the clutch and brake mechanism might be effected by other means.

I claim:

1. In a punch press having a standard and a lug extending therefrom, the combination of a crank shaft and a reciprocating head actuated thereby, the crank shaft having a driving element rotatably mounted thereon and a clutch bolt for engaging with the driving element whereby the crank shaft is rotated, a rock shaft journaled in the standard, a latch having one end secured to the rock shaft, the free end of the latch being adapted to disengage the clutch bolt from the driving element, a brake band bifurcated at one end and surrounding the crank shaft with the bifurcated end secured to the lug, a bell crank mounted on the lug, one leg of the bell crank being connected to the free end of the brake band, an arm extending laterally from the rock shaft on the end opposite the latch, links connecting the last named arm to the other arm of the bell crank whereby movement of the latch will rock the bell crank to release the free end of the brake band permitting the crank shaft to be freely rotated, and a treadle connected to the rock shaft to move the latch and release the brake simultaneously.

2. In a punch press having a crank shaft journaled in a standard, a brake mechanism tending to hold the shaft against rotation, a driving element rotatable on the shaft, a spring-pressed clutch bolt movably carried by the shaft and adapted to establish driving connection with the driving element, means interposed between the clutch bolt and brake mechanism whereby the brake mechanism is released from frictional engagement with the shaft simultaneously with the initial advance of the clutch bolt into engagement with the driving element, and means secured to the standard to finally advance the clutch bolt into engagement with the driving element.

3. In a punch press, the combination of a standard, a crank shaft journaled therein, a fly wheel having recesses at its hub rotatably mounted on the crank shaft, a spring-pressed clutch bolt slidably mounted on the crank shaft and adapted to enter one of the recesses in the fly wheel to drive the crank shaft, a bell crank pivotally connected to the crank shaft and having one arm connected to the clutch bolt, a rock shaft journaled in the standard, a latch extending from one end of the rock shaft with its free end normally lying in the path of the other arm on the bell crank so as to contact therewith to disengage the clutch bolt, brake mechanism surrounding the shaft at its end opposite the fly wheel, actuating means connecting the brake mechanism with the rock shaft, a spring normally holding the rock shaft in a position whereby the brake mechanism is in friction engagement with the crank shaft and the latch lying in a position to disengage the clutch bolt, and means for rotating the rock shaft from its normal position.

4. In a punch press, the combination of a standard, a crank shaft journaled therein, a reciprocating head actuated thereby, a fly wheel having recesses in its hub rotatably mounted on the crank shaft, a spring-pressed clutch bolt movably mounted on the crank shaft, means for releasing the clutch bolt whereby it is initially moved into one of the recesses of the fly wheel to rotate the crank shaft, and means projecting outwardly from the standard in the path of the clutch bolt whereby the bolt is positively forced into the recess upon contacting with the last named means.

5. In a punch press, the combination of a standard, a crank shaft journalled therein and provided with a brake drum, a flexible one-piece brake band surrounding the brake drum and having one end secured to the standard, a bell crank having one of its arms connected to the other end of the brake band, a toggle lever connected to the other arm of the bell crank and adapted to operate the same for tightening the brake band upon the brake drum, a manually operated rock shaft connected to the toggle lever, a driving element rotatable on the crank shaft, clutch mechanism including a clutch bolt between the crank shaft and driving element, clutch releasing mechanism secured to the rock shaft, and spring means associated with said mechanisms tending to tighten the brake band upon the brake drum and simultaneously release the clutch mechanism.

HARRY C. H. WALSH.